Aug. 31, 1937.  D. B. BAKER ET AL  2,091,464
TRACTOR
Filed Feb. 24, 1936  5 Sheets-Sheet 1

Inventors
D. B. Baker
C. R. Rogers
N. O. Panzegrau
By
Atty.

Aug. 31, 1937.      D. B. BAKER ET AL      2,091,464
TRACTOR
Filed Feb. 24, 1936      5 Sheets-Sheet 4

Inventors
D. B. Baker
C. R. Rogers
N. O. Danzegrau
By V. T. Lavaque
Atty.

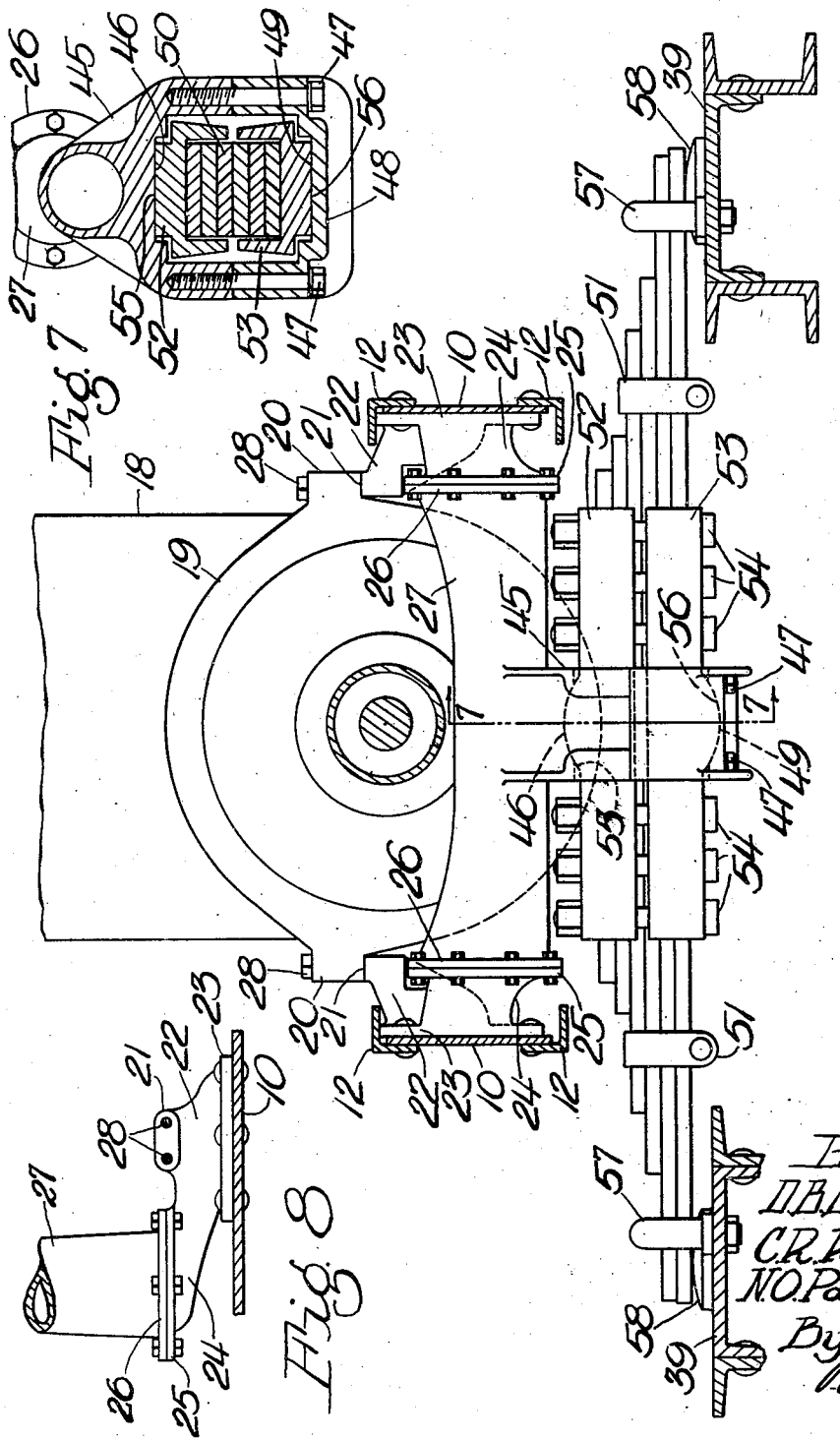

Patented Aug. 31, 1937

2,091,464

UNITED STATES PATENT OFFICE 2,091,464

TRACTOR

David B. Baker, Riverside, Clifford R. Rogers, Oak Park, and Norman O. Panzegrau, Chicago, Ill., assignors to International Harvester Company, a corporation of New Jersey Application February 24, 1936, Serial No. 65,383

9 Claims. (Cl. 180—9.1)

The invention relates generally to tractors, and, in a specific sense, to the provision of an improved main frame structure for carrying operative parts.

More particularly the invention relates to the provision of an improved frame for tractors of the crawler type, the same including means which will permit mounting of the frame in an improved manner on the usual side crawler frames utilized in tractors of this type.

In crawler tractors of the heavy duty type, which have a dead weight of a great many tons, it is important that the main frame be unusually strong. It is a well known fact that, due to the use of the crawler mechanisms operating over uneven terrain, the main frame is subjected to great strains and, therefore, the frames are made unusually heavy, so that parts carried on the frame will not become misaligned or thrown out of their normal operative positions. A three-point suspension is commonly employed for mounting the main frame on the crawler devices, but, even with the use of such means, which serves to prevent twisting of the frame to some extent, it still is necessary to make the frame very strong.

The main object of the present invention is to provide a main frame structure for a tractor, which will be relatively light weight without sacrificing the necessary strength.

Another object is to provide a main frame of a built up structure so arranged that it will serve to tie together and hold in place certain transmission box parts for the transmission gearing used in driving and controlling the tractor.

Another object is to provide an improved means included in the frame for carrying an equalizer bar in providing a third point of suspension for the main frame on the crawler track frames.

Another object is to provide means associated with the equalizer bar mounting in the nature of an auxiliary bracket for mounting the rear end of the motor, which is mounted on the forward end of the improved main frame.

Still another object is to provide an improved draw-bar means carried by the tractor body in a simple and effective manner, so that draw-bar pulls are transmitted directly to the main frame.

Other important objects will become apparent to those skilled in the art as the disclosure is more fully made.

These desirable objects may be attained by the form of the invention herein shown and described for purposes of illustration, and which form incidentally is a desirable, practicable form. In this form, the main frame comprises a pair of longitudinally spaced, sheet steel, flat, side plates lying in vertical planes, and being of a greater width in an up and down direction at their rear ends than at their forward ends. In other words, these side plates taper and narrow down toward their forward ends. At their rear ends these side plates are bolted to transmission box parts, which serve to cross-brace the side frames and hold them in properly spaced relationship.

The front ends of the side frames are cross-connected by a bolster and an intermediate portion of the side frame plates is cross-connected by an equalizer bar bolster support for transmitting the weight at the forward end of the tractor to the side frames of the crawler track device. This equalizer supporting bolster includes a bracket structure for carrying the rear end of the motor and a forwardly disposed transverse cross sill is connected between the side frames for carrying the front end of the motor. The motor is thus suspended in the frame at three points.

The rear transmission box part extends rearwardly of the rear ends of the side frame sills and includes side auxiliary housings or cover plates bolted to the sides of the box, there being arranged between the side walls and said cover housing a rearwardly extending, vertical plate, which serves as a draw-bar mounting. Further, the transmission box at its rear lower edge carries integrally formed depending bosses, providing transversely aligned journals for a transversely disposed dead axle, the ends of which project through the side cover housings to provide trunnions or pivot centers for pivotally mounting the rear ends of the side crawler track frames. It will thus be seen that the main frame structure described has its dead weight transmitted to the side crawler track devices at three points in the well known, three point suspension principle commonly employed in crawler tractors. The main side frame sills of the frame and body structure above generally described include along their upper and lower edges angle bar stiffeners, as will later appear.

In the accompanying sheets of drawings illustrating the preferred example of the invention,—

Figure 6 is a transverse, sectional view showing in elevation the equalizer bar mount and rear motor mount taken along the line 6—6 of Figure 1, looking in the direction of the arrows;

Figure 7 is a longitudinal sectional view through the equalizer bar mount taken along the line 7—7 of Figure 6, looking in the indicated direction; and, Figure 8 is a plan, detail view of a motor mount bracket and the manner of its association with the main frame and the cross bolster member which serves as the equalizer mount.

The main frame members of the tractor comprise a pair of transversely spaced, longitudinally running sheet metal plates 10, which lie in vertical planes and have their greatest width in a vertical direction at their rear ends, so that these sills or plates taper from the rear ends to the front ends, with the front ends being narrowest in a vertical direction. The front ends of these frame plates 10 are cross-connected by a bolster 11. The upper and lower edges of each plate 10 have riveted thereto upper and lower strengthening angle bars 12, each angle bar presenting a horizontal flange which faces inwardly. In other words, the vertical flange of each angle bar is fastened to the outside face of the respective plate 10.

Figure 1:
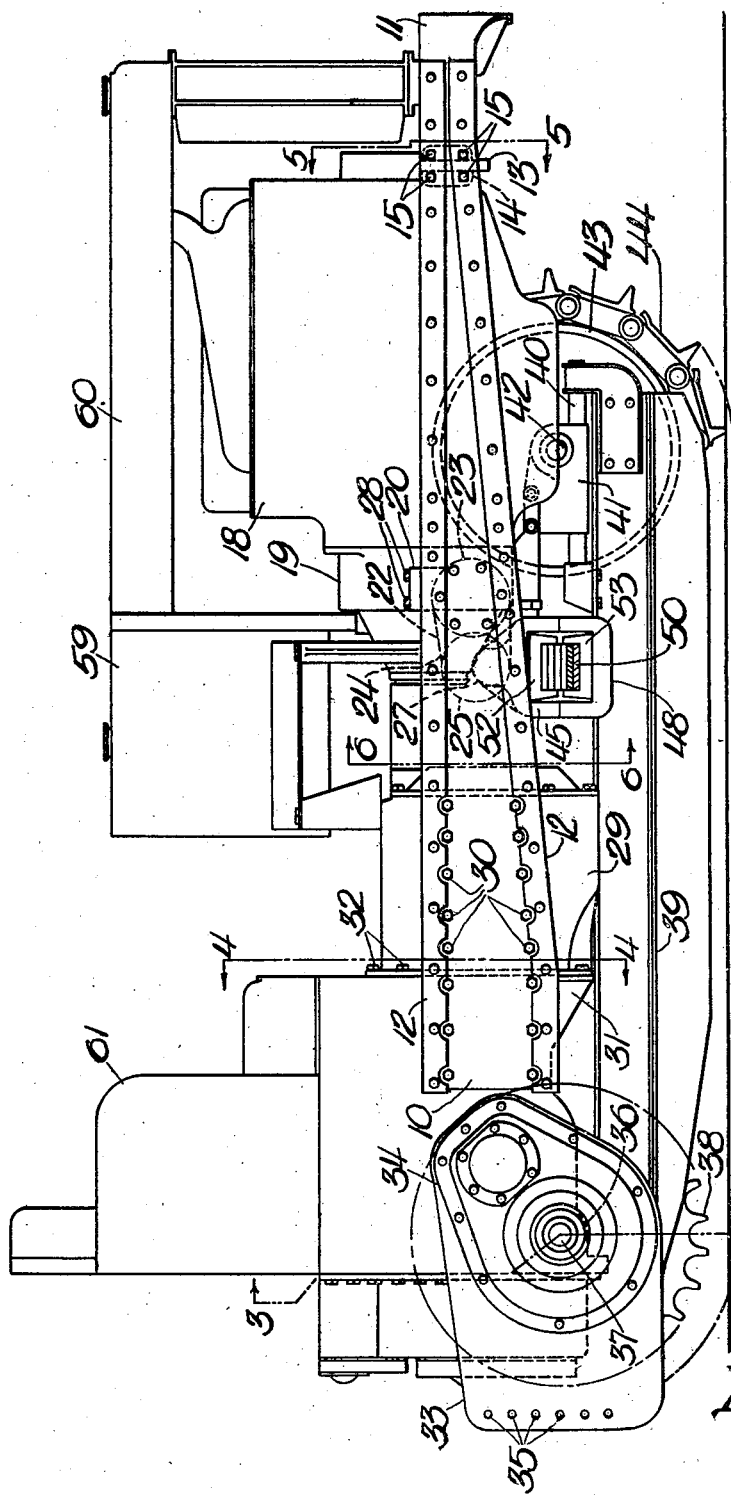
Figure 1 is a general side elevational view of a tractor embodying the improved frame and body structure.
Figure 2:
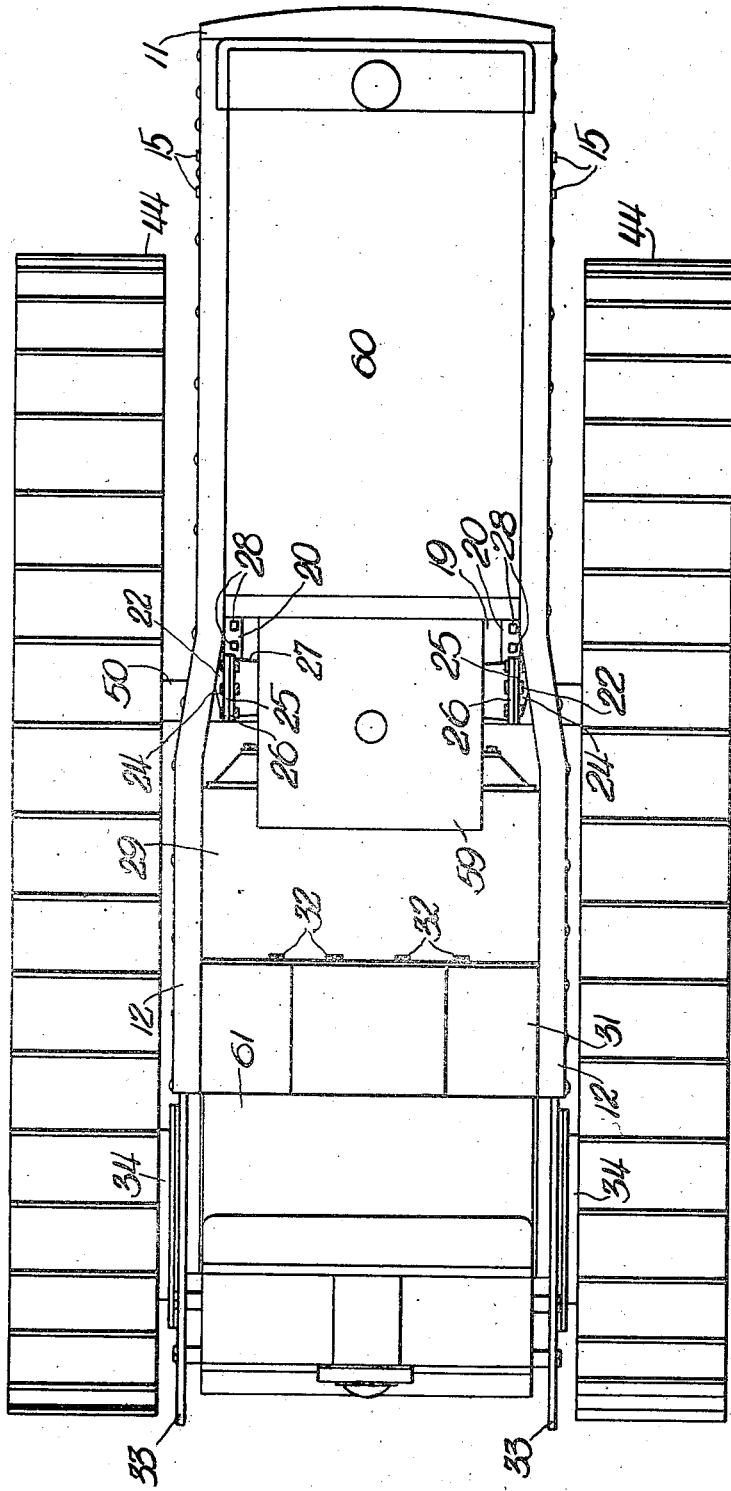
Figure 2 is a general plan view of the tractor.
Figure 5:
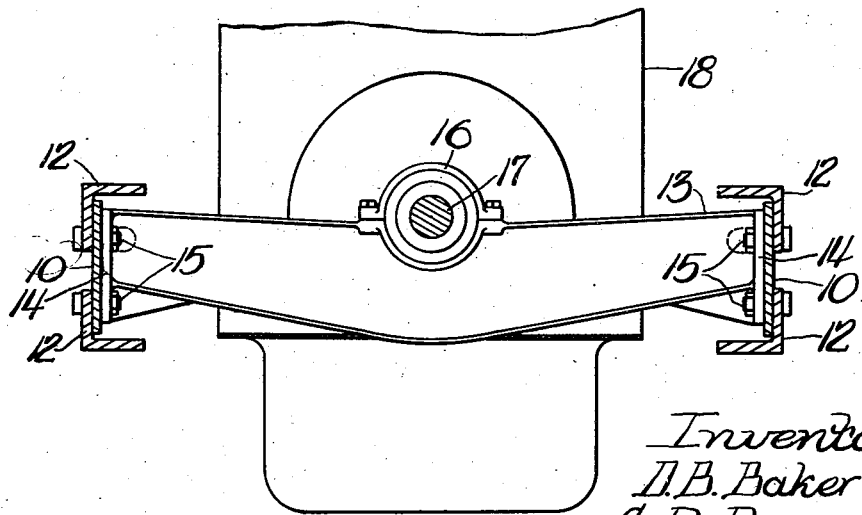
Figure 5 is a transverse, sectional view taken along the line 5—5 of Figure 1, looking in the direction of the arrows to show the manner of mounting the front end of the engine.

Slightly to the rear of the bolster 11 the side frames 10 carry, as shown in Figures 1 and 5, a cross plate 13 having its ends finished with attaching flanges 14 connected by bolts 15 through the angle bars 12 and the plates 10. Between its ends this cross member 13 carries a journal block 16 for mounting the front end of the crank shaft 17 of a motor 18. The rear end of the motor 18 includes the usual fly-wheel housing 19 formed on opposite sides with vertical bosses 20 which respectively rest on horizontal, finished surfaces or pads 21 included in respective brackets 22, which have substantially circular flanged outer ends 23 riveted or otherwise securely connected to the side frame plates 10, as indicated in Figures 6 and 8. The bracket 22 on each side of the tractor frame includes a rearwardly extending portion 24 and a circular flange 25, to which is secured the opposite circular end flanges 26 of a cross tubular bolster member 27, which, as later will appear, includes means for the suspension hanging of an equalizer bar.

It can now be seen that the motor 18 is suspended at three points on the main frame 10, the forward single point being at the journal box 16 and the two rear points being on the brackets 22. Bolts 28 pass through the bosses 20 for connecting the two rear points of suspension for the motor on the respective brackets 22. Forwardly of the rear ends of the side frame members 10, the body of the tractor includes a relatively small transmission box part 29, which has its opposite sides secured by bolts 30 to the side frames 10. Thus, the part 29 acts as a cross stiffener between the two side plates 10. Each side plate 10 spans the side walls of the box part 29, as shown in Figure 1, and extends rearwardly thereof a short distance, so that the members 10 at their rear ends may be securely bolted to the side walls of a relatively large transmission box part 31, which at its front side is secured by bolts 32 to the rear face of the box 29 heretofore described. Thus, these two transmission box parts 29 and 31 are joined together in a manner to be braced by the frame pieces 10 and in turn serving as cross braces for the members 10.

Figure 3:
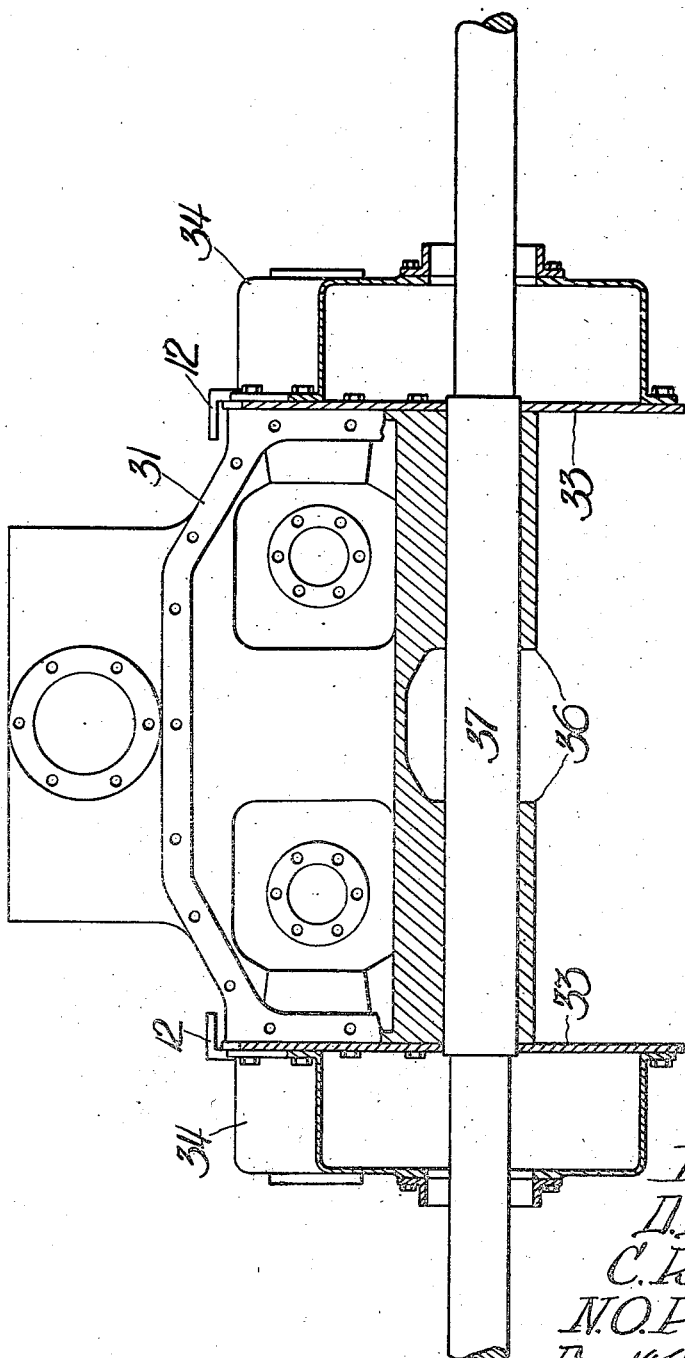
Figure 3 is a transverse sectional view through the rear portion of the body taken along the line 3—3 of Figure 1, looking in the direction of the arrows.
Figure 4:
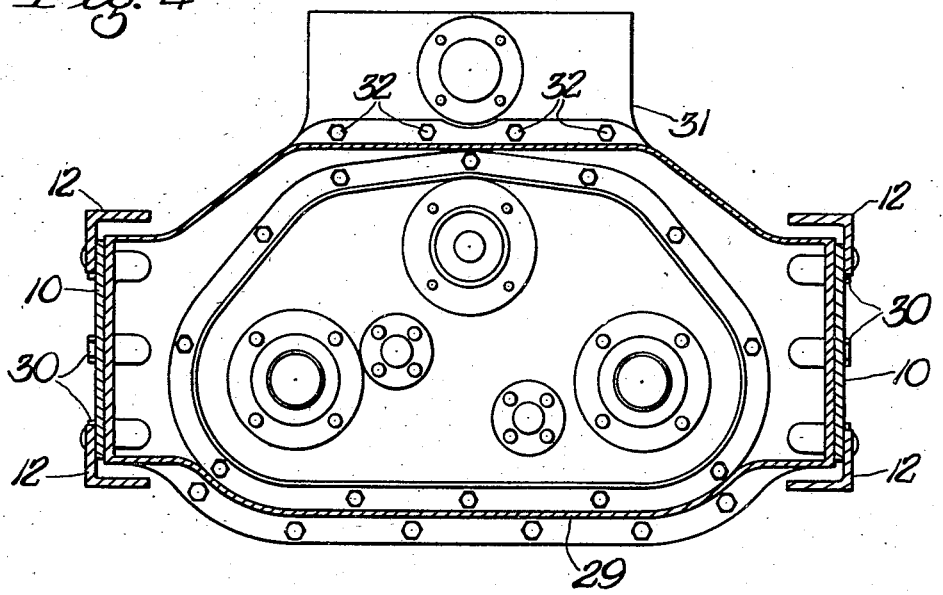
Figure 4 is a transverse sectional view through the frame and through a transmission box portion taken along the line 4—4 of Figure 1, looking in the direction of the arrows.

The transmission box 31, as shown in Figure 1, extends a substantial distance rearwardly of the rear ends of the side frames 10. Just rearwardly of the rear end of each side frame 10, the sides of the box 31 have flat finished surfaces, as shown in Figure 3, against which is laid a flat plate 33 on each side of the tractor, and, clamped against said plates and through a bolt circle formed in the sides of the box 31 are cover plates 34. In other words, on each side of the box 31 there is secured to said side a rearwardly extending, vertical plate 33, and, secured to the plate 33 and the box 31, are gear housing covers 34. The plates 33, thus clamped between the covers 34 and the side walls of the housing 31, are vertically disposed and extend rearwardly a substantial distance with their rear edges provided with a vertical series of holes 35 serving as a convenient means for the connection to the plate 33 of any desirable draft devices. By this construction, the draw-plates 33 are securely anchored to the body of the tractor, which is a desirable feature of construction.

The lower, rear portion of the box 31 is formed with depending bosses 36 having transversely aligned bores for mounting a transverse dead axle 37, which, as shown in Figure 3, has its opposite ends projecting through the covers 34. These oppositely projected ends respectively carry in any desired manner concentric, rear driving sprocket wheels 38 indicated in Figure 1. Further, on each side of the tractor is provided the usual forwardly and longitudinally extending side truck frame 39, which has its rear end pivotally connected in any desired manner to the adjacent end of the dead axle 37 for pivotal movement in a vertical plane. The forward end of each side truck frame 39 carries a suitable mount 40 for a journal box 41 that mounts a transverse, horizontal pivot pin 42 for a front idler wheel 43. In other words the front end of each side truck frame 39 carries an idler or guide wheel 43, which is enveloped by the front end of an endless track shoe band 44 driven from the respective sprocket wheel 38 on each side of the tractor in a manner well known and common in this art. It can now be seen that the weight of the rear end of the tractor is transmitted through the ends of the dead axle 37 to the rear ends of the opposite side truck frames 39 and through the usual track rollers of the frames, not shown, to the ground. Thus, two points of suspension for the rear end of the tractor body frame have so far been described. A forward third point of suspension is also provided, and this structure will next be described.

Referring to Figures 1, 6, and 7, it will be seen that the transverse, hollow bolster 27, intermediately of its ends, carries a depending, integrally formed extension bracket 45, which bracket is bifurcated, as shown in Figure 7, and provides an upper rounded portion 46 forming the surface of a cylinder. By means of bolts 47, a lower block 48 is bolted to the bracket 45, said lower block having its inner surface finished to provide another surface 49 of the same cylinder. The bracket 45 and block 48 thus in effect provide a journal box having a cylindrical bearing surface provided thereby.

There is next provided an equalizer spring 50 embodying a number of laminations, some of which are held together at their ends by clips 51 and the center portion of the leaf pack being held together by an upper clamp block 52 and a lower clamp block 53, which clamp blocks embrace the spring pack and are securely held together by bolts 54. The upper clamp block 52 includes a cylindrical surface conformation 55, and the lower clamp block 53 includes a cylindrical surface conformation 56. These surfaces 55 and 56 fit the surface of the bearing cylinder provided by the bracket 45 and the block 48, so that the equalizer spring 50, when transversely disposed in its normal position, has its mid-portion pivotally mounted on a horizontal, longitudinal axis in the lower end of the bracket 45. This axis is surrounded by a relatively large cylinder formed by the parts described, so that the great weight of the tractor is properly transmitted to this third point of support through a broad bearing surface.

Opposite ends of the leaf spring equalizer pass through U-bolt guides 57 carried on the top face of the track frames 39, said ends slidably resting on blocks 58 also carried on the track frames 39.

The box part 29 of the transmission housing structure and the fly-wheel housing 19 of the motor in any desirable manner respectively carry means for supporting a fuel tank 59 at the rear end of a hood 60 for the motor. The top surface of the large transmission box part 31 carries a seat 61 for the tractioneer, and the space between the seat 61 and the fuel tank 59 in effect constitutes an operator's compartment.

This completes the description of the improved body or frame structure, and it will be seen that the same provides a very sturdy backbone for a crawler tractor of the heavy duty type, which, because of its employment of built-up structural parts, is very strong, though relatively light in weight. The side frames 10 provide an effective mounting for the transmission parts 29 and 31, as well as for the motor, and the equalizer unit, all of these parts cooperating to produce a very desirable tractor frame. The frame also lends itself very nicely to the usual three point suspension thereof on the crawler track side frames, so that, when the crawler tracks operate over uneven ground, the twisting strains imparted to the main frame and body parts will be reduced to a minimum.

It is the intention to cover all changes and modifications which do not depart from the spirit and scope of the invention as hereinafter claimed.

What is claimed is:

1. A body structure for tractors comprising a pair of spaced longitudinal side plates lying in vertical planes and including an angle bar rail connected to an edge thereof providing a horizontal inturned flange, a cross-connection between the plates at their forward portions including means for supporting the front end of a motor, a bracket carried by each plate rearward of the aforesaid cross-connection for supporting each side of the bell housing of the motor, a transmission box connected to and between the plates at their rear ends with the box projecting rearwardly of the rear ends of the plates, and cover housings connected to the opposite sides of the box rearwardly of the rear ends of the plates and independently of the latter.

2. A body structure for tractors comprising a pair of spaced longitudinal side plates lying in vertical planes and including an angle bar rail connected to an edge thereof, cross connections between the plates at their forward portions including means for mounting a motor, a transmission box connected to and between the plates at their rear ends with the box projecting rearwardly of the rear ends of the plates, cover housings connected to the opposite sides of the box rearwardly of the plates, and draft appliance plates clamped between each cover housing and the adjacent side wall of the box, said appliance plates including apertured extensions protruding rearwardly of the box.

3. A tractor frame comprising a pair of spaced longitudinal side plates lying in vertical planes and including reenforcing rails at their edges, a transmission box connected between and to the plates, a second transmission box connected between and to the plates rearwardly of the first box, said two boxes being connected in end to end relation with the rear box extended rearwardly of the rear ends of the plates, said rear box including means for carrying a transverse axle, and means at the forward ends of said side plates for supporting the forward end of a motor, and brackets between said last named means and the first transmission box and secured to the side plates each side of the bell housing of the motor for supporting the rear end of the motor.

4. A tractor frame comprising a pair of spaced longitudinal side plates lying in vertical planes and including reenforcing rails at their edges, a transmission box connected between and to the plates, a second transmission box connected between and to the plates rearwardly of the first box, said two boxes being connected in end to end relation with the rear box extended rearwardly of the rear ends of the plates, said rear box including means for carrying a transverse axle, side housing covers on each side of the box disposed rearwardly of the rear ends of said side plates and mounted independently thereof, means at the forward ends of said side plates for supporting the forward end of a motor, and brackets carried by each side plate intermediate said supporting means and the first transmission box and secured to the bell housing of the motor for supporting the rear end of the motor.

5. A tractor frame adapted for three point mounting on side crawler frames of a crawler tractor, said frame comprising a pair of spaced longitudinal side plates lying in vertical planes and including reenforcing rails along an edge thereof, a transmission box connected between and to the plates, a second transmission box connected between and to the plates rearwardly of the first box, said two boxes being connected in end to end relation with the rear box extending rearwardly of the rear ends of the plates, said rear box including means for carrying a transverse axle the ends of which provide two points of suspension, side housing covers on each side thereof rearwardly of the rear ends of said side plates with said axle passed therethrough, means at the forward ends of said side plates for mounting a motor, and other means included in the frame forwardly of the boxes for providing a third point of suspension.

6. A tractor frame adapted for three-point mounting on side crawler frames of a crawler tractor, said frame comprising a pair of spaced longitudinal side plates lying in vertical planes, a transmission box connected between and to the plates, a second transmission box connected between and to the plates rearwardly of the first box, said two boxes being connected in end to end relation with the rear box extended rearwardly of the rear ends of the plates, said plates having deep rear ends to provide a relatively large face for securement to the rear box, said rear box including means for carrying a transverse axle which at its ends provides two rear points of suspension, means at the forward ends of said side plates for mounting a motor, and a cross-bolster connecting the plates between the boxes and the motor mounting means for providing a forward third point of suspension.

7. A frame for crawler tractors having side crawler units, said frame comprising a pair of spaced, longitudinal side plates lying in vertical planes, a transmission box connected between the rear ends of said side plates including means providing weight transmitting points for suspending the frame on the crawler units, a bracket carried on the inside of each side plate at a point between their ends and forwardly of the box, said brackets including pads to mount the rear end of a motor, means included in the frame to mount the front end of a motor, said brackets having extensions, a cross-bolster member connected between said extensions, said member having a depending hanger portion including means providing a central longitudinal and horizontal cylinder bearing portion, and a transverse equalizer bar having a central cylinder portion journaled in the bearing portion to provide a third point of suspension for the frame with the ends of said bar respectively carried on the opposite crawler units.

8. A frame for crawler tractors having side crawler units, said frame comprising a pair of spaced, longitudinal side plates lying in vertical planes and including reenforcing edge rails, a transmission box connected between the rear ends of said side plates including means providing weight transmitting points for suspending the frame on the crawler units, a bracket carried on the inside of each side plate at a point between their ends, said brackets including pads to mount the rear end of a motor, means included in the frame to mount the front end of a motor, said brackets having extensions, a hollow cross-bolster member connected between said extensions, said member having a depending hanger portion including means providing a central longitudinal and horizontal cylinder bearing portion, and a transverse equalizer bar having a central cylinder portion journaled in the bearing portion to provide a third point of suspension for the frame with the ends of said bar respectively carried on the opposite crawler units.

9. A frame for crawler tractors having side crawler units, said frame comprising a pair of spaced, longitudinal side plates lying in vertical planes and including reenforcing edge rails, a transmission box connected between the rear ends of said side plates including means providing weight transmitting points for suspending the frame on the crawler units, a bracket carried on the inside of each side plate at a point between their ends, said brackets including pads to mount the rear end of a motor, means included in the frame to mount the front end of a motor, said brackets having extensions, a cross-bolster member connected between said extensions, said member having a depending hanger portion including means providing a central longitudinal and horizontal cylinder bearing portion, a transverse equalizer bar having a central cylinder portion journaled in the bearing portion to provide a third point of suspension for the frame with the ends of said bar respectively carried on the opposite crawler units, side cover housings secured to each side of the box rearwardly of the rear ends of the plates, and draw-plates secured to said box sides with the cover housings arranged outwardly thereof and the draw-plates extending rearwardly of the rear end of the box.

DAVID B. BAKER.
CLIFFORD R. ROGERS.
NORMAN O. PANZEGRAU.